United States Patent [19]

Gould

[11] 3,912,709

[45] Oct. 14, 1975

[54] ZINC AND ZINC-CALCIUM SALTS OF PARTIAL ESTERS OF ROSIN

[75] Inventor: Charles Webster Gould, Shipley Heights, Wilmington, Del.

[73] Assignee: Hercules Incorporated, Wilmington, Del.

[22] Filed: July 3, 1974

[21] Appl. No.: 485,420

Related U.S. Application Data

[63] Continuation-in-part of Ser. No. 51,711, July 1, 1970, abandoned.

[52] U.S. Cl. ................. 260/100; 260/103; 260/104; 260/105
[51] Int. Cl.[2] ........................................... C09F 1/00
[58] Field of Search ............ 260/100, 19, 105, 103, 260/104

[56] References Cited

UNITED STATES PATENTS

| 2,138,140 | 11/1938 | Clare | 134/26 |
|---|---|---|---|
| 2,346,995 | 4/1944 | Palmer | 260/100 |
| 3,037,872 | 6/1962 | Varron | 260/105 |

*Primary Examiner*—Lewis T. Jacobs
*Attorney, Agent, or Firm*—Charles L. Board

[57] ABSTRACT

Disclosed are novel zinc salts and zinc-calcium salts of partial esters of rosin which have particular utility as tackifiers for natural rubber and synthetic rubber.

4 Claims, No Drawings

ZINC AND ZINC-CALCIUM SALTS OF PARTIAL ESTERS OF ROSIN

This application is a continuation-in-part of application Ser. No. 51,711, filed July 1, 1970, and now abandoned.

This invention relates to novel rosin-base compounds which are zinc and zinc-calcium salts of partial esters of rosin.

In accordance with this invention there are provided novel rosin-base materials adapted particularly for use as tackifiers for rubber (including natural rubber and synthetic rubber) and for rubber-base adhesives. The novel rosin-base materials of this invention are derived by reacting a partial ester of rosin with an appropriate metal compound such as zinc oxide, calcium hydroxide, and the like, to provide a zinc or a zinc-calcium salt of the rosin partial ester, said rosin-base material being essentially free of unreacted rosin acids.

The novel salts of this invention will have melting points between about 80°C. and about 170°C., and preferably from about 90°C. to about 165°C., as determined by the "Hercules drop method". Melting points given herein and in the claims are determined by the "Hercules drop method" which is specifically as follows: first, 0.50 to 0.55 gram of the novel zinc or zinc-calcium salt of this invention is molded around the bulb of a thermometer by immersing the thermometer bulb in the heated material. The thermometer is then fitted through a cork in a test tube to within one-half inch of the bottom of the test tube. The test tube is then immersed in a water bath or an oil bath and the bath heated gradually. The temperature at which the zinc or zinc-calcium salt necks off the thermometer bulb is taken as the melting point.

The term rosin, as employed herein, includes natural rosin, refined or unrefined (refined rosin will usually contain, by weight, about 90% of rosin acids and about 10% of inert material), such as natural wood rosin, natural gum rosin, and tall oil rosin; modified rosin, refined or unrefined, such as disproportionated rosin, hydrogenated rosin, and polymerized rosin; and the pure or substantially pure acids, of which rosin is comprised, alone or in admixture.

In accordance with this invention, rosin is first reacted with an amount of alcohol to provide a rosin-base composition containing rosin ester and unesterified rosin acids, such rosin-base composition being referred to in the art and herein as "partial ester of rosin" or "partial rosin ester".

The partial esters of rosin employed in this invention are derived by reaction of rosin and an alcohol such as a monohydric alcohol or a dihydric alcohol. For each equivalent weight of rosin reactant there is employed from about 5% equivalent weight to about 60% equivalent weight of alcohol. Monohydric alcohol reactants that can be employed are $C_1$-$C_4$ monohydric alcohols and include methyl alcohol, ethyl alcohol, propyl alcohol, isopropyl alcohol, n-butyl alcohol, sec-butyl alcohol, isobutyl alcohol, and t-butyl alcohol. Suitable dihydric alcohol reactants include ethylene glycol, diethylene glycol, triethylene glycol, 1,2-propane diol, and 1,3-propane diol.

Reaction is preferably carried out in an inert atmosphere. Reaction temperatures for reaction of a monohydric alcohol reactant and rosin reactant will be about 150°C. to about 250°C.; for a dihydric alcohol reactant and rosin reactant, reaction temperatures will be about 260°C. to about 275°C. The reaction with a monohydric alcohol will be carried out in a pressure vessel under autogenous pressure. Reaction is carried out until the acid number of the reaction mass does not change more than 1 unit in a one-half hour period, thereby indicating that substantially all alcohol reactant has reacted.

The zinc and zinc-calcium salts of the partial rosin esters can be prepared by reacting the partial rosin ester, in its fused state, with an appropriate zinc compound such as zinc oxide in the case of the zinc salts and, in the case of the zinc-calcium salts, additionally with an appropriate calcium compound such, for example, as calcium hydroxide.

The salts can also be prepared by reacting the partial rosin ester in solution with the appropriate metal compound. Temperatures employed to prepare the zinc salts and the zinc-calcium salts by the solution technique will be of the order of from about 60° to 190°C. Reaction time will be from about 15 minutes to 3 hours, depending on the temperature employed, the lower temperatures requiring a longer period of time to complete the reaction than the higher temperatures. Suitable solvents for the solution technique include toluene, xylene, benzene, mineral spirits, heptane, naphtha, and mixtures thereof. Solids concentration of the solution will be of the order of from about 30% to about 75% by weight of the total solution weight.

The metal compound will be employed in an amount at least sufficient to react with essentially all the unesterified rosin acids present in the partial rosin ester. Thus, there will be little, if any, unreacted rosin acid present in the final product. To insure that essentially all the unesterified rosin acids present in the partial rosin ester are reacted, a slight excess of metal compound is preferably employed, and the resulting product will be slightly alkaline as shown in the examples.

In the case of the zinc salts, the amount of zinc compound employed will be such that the amount of combined zinc will be, by weight, from about 6% to about 10.8% of the total weight of the zinc salt. In the case of the zinc-calcium salts, the amount of zinc compound employed will be such that the amount of combined zinc will be, by weight, from about 3.1% to about 6.1% of the total weight of the zinc-calcium salt; and the amount of calcium compound employed will be such that the amount of combined calcium will be, by weight, from about 0.9% to about 2.1% of the total weight of the zinc-calcium salt.

The following procedure is used to prepare the salts set forth in the examples of the tables that follow. The amounts of reactants used in each example are specified in the table as are certain properties of the product produced.

Into a reaction vessel fitted with a thermometer, a motor driven stirrer and a steam heated reflux condenser are added (1) hydrogenated wood rosin having an acid number 162-164; a bromine number, 98-108; and a melting point of 76-78°C. and (2) the specified alcohol. Reaction is carried out in an atmosphere of nitrogen. Heat is applied to the reaction vessel and steam is started through the reflux condenser. When the rosin has fused, the thermometer and stirrer are lowered into the fluid mass and stirring is begun. The temperature of the reaction mass is maintained at about 270°C. until the acid number thereof does not change more than one unit in a one-half hour period. At this point, the reaction mixture or mass is cooled to about 150°C. A water separator is inserted between the reaction vessel and the reflux condenser and the reflux condenser changed from steam to tap water. Mineral spirits (available commercially as Sun Spirits) having a Kauri-Butanol value of 36.5–39.5 and a distillation range of 151.5° to 210 °C. are added to the reaction vessel in an amount sufficient to give a 60% solids solution, based on the original unreacted hydrogenated rosin. The mineral spirits--reaction mass mixture is heated to about 150°C. and the reaction mass goes into solution. In those examples relating to zinc salts, zinc oxide is added slowly to the solution. The period of addition is about 10 minutes. Acetic acid is employed as a catalyst in the salt formation and the acetic acid is added slowly to the reaction vessel to avoid excessive foaming which is undesirable. After the acetic acid has been added, the resulting reaction mass is heated slowly to reflux temperature (about 180°C.) and maintained at reflux Pressure Sensitive Tape Council. The only variation is that the films are cast on 4 × 8 inch glass plates instead of on tape.

Toluene solutions are prepared from each resinate and natural rubber in proportions to give solutions containing 60, 80, and 100 parts of resinate per 100 parts of rubber. Films are cast from the solutions and, after drying 24 hours at 24°C. and 50% Relative Humidity, are tested in accordance with the above test method.

In the tables below, the tack values are expressed in the distance (by inches) the rolling stainless steel ball travels over the film surface before it comes to a complete stop. The shorter the distance, the greater the tack. A distance of 6 inches or greater has been arbitrarily defined as zero tack.

In the tables, DEG represents diethylene glycol and TEG represents triethylene glycol. The % ester denotes the fraction of the total number of equivalents of rosin that have been neutralized by the glycol.

Table I

| Ex. No. | Hydrogenated Rosin (Parts) | Alcohol-DEG (Parts) | % Ester | Zinc Oxide[1] (Parts) | Calcium Hydroxide[2] (Parts) | % Zn in Resinate Product | % Ca in Resinate Product | Melting Point | Alkalinity meq./g. | Tack Value, Inches | | |
|---|---|---|---|---|---|---|---|---|---|---|---|---|
| | | | | | | | | | | 60 phr. | 80 phr. | 100 phr. |
| 1 | 400 | 30.8 | 50 | 18.63 | 8.84 | 3.68 | 0.99 | 95°C. | 0.06 | 1.6 | 1.4 | 1.2 |
| 2 | 400 | 24.6 | 40 | 22.4 | 10.61 | 4.14 | 0.71 | 105°C. | 0.17 | 1.4 | 1.3 | 1.9 |
| 3 | 400 | 18.42 | 30 | 26.1 | 12.38 | 4.87 | 1.20 | 119°C. | 0.19 | — | — | — |
| 4 | 400 | 16.57 | 27 | 27.9 | 13.25 | 5.10 | 1.41 | 128°C. | 0.33 | 1.5 | 2.3 | 5.0 |
| 5 | 400 | 12.30 | 20 | 29.9 | 14.14 | 5.56 | 1.48 | 144°C. | 0.22 | 2.6 | 6+ | 6+ |
| 6 | 400 | 6.14 | 10 | 33.6 | 15.90 | 6.10 | 1.71 | 162°C. | 0.31 | 5.4 | 6+ | 6+ |

[1] 99.2% pure
[2] 97.6% pure

TABLE II

| Ex. No. | Hydrogenated Rosin (Parts) | Alcohol-TEG (Parts) | % Ester | Zinc Oxide (Parts) | % Zn in Resinate Product | Melting Point | Alkalinity meq./g. | Tack Value, inches | | |
|---|---|---|---|---|---|---|---|---|---|---|
| | | | | | | | | 60 phr. | 80 phr. | 100 phr. |
| 7 | 400 | 25.8 | 30 | 51.0[1] | 8.09 | 98°C. | 0.68 | 1.5 | 1.4 | 1.3 |
| 8 | 400 | 17.2 | 20 | 58.3[1] | 9.24 | 115°C. | 0.78 | 1.7 | 1.6 | 2.3 |
| 9 | 400 | 13.05 | 15 | 62.0[1] | 9.78 | 120°C. | 0.82 | 1.0 | 1.0 | 1.2 |
| 10 | 400 | 9.55 | 11 | 66.4[2] | 9.87 | 122°C. | 0.83 | 1.2 | 1.2 | 2.0 |
| 11 | 400 | 8.60 | 10 | 65.5[1] | 10.28 | 128°C. | 0.85 | 1.1 | 1.0 | 1.4 |

[1] 99.2% pure
[2] 96.8% pure until reaction is substantially complete as shown by no more water being collected. When calcium hydroxide is to be added also, the temperature is held at reflux for 5 minutes, then cooled to about 5°–10°C. below reflux. A 33% dispersion of calcium hydroxide in mineral spirits is then added slowly and cautiously. Additional acetic acid catalyst is then added and the reaction mixture slowly heated to reflux temperature and maintained at reflux until reaction is substantially complete. The reaction mass is filtered by suction with a Buchner Funnel to give a brown but sparkling clear solution. This filtrate is stripped of solvent and acetic acid by distillation, leaving a residue of clear brown resinateester which is resinous in appearance. The total acetic acid catalyst employed is about 0.3 part to about 2.5 parts, based on 100 parts unesterified rosin. The properties of the reaction products are set forth in the tables.

Tack properties are measured by the Rolling Ball Method, PSTC-6 as set forth in Test Methods for Pressure Sensitive Tapes, Fifth Edition, published by the In Example 1, the amount of acetic acid catalyst used during the zinc oxide reaction is about 0.835 part and the amount of additional acetic acid added for the calcium hydroxide reaction is about 0.735 part. In Example 2, the amount of acetic acid catalyst used during the zinc oxide reaction is about 1.055 parts and the amount of additional acetic acid added for the calcium hydroxide reaction is about 0.525 part. In Example 3, the amount of acetic acid catalyst used during the zinc oxide reaction is about 1.045 parts and the amount of additional acetic acid added for the calcium hydroxide reaction is about 0.735 part. In Example 4, the amount of acetic acid catalyst used during the zinc oxide reaction is about 1.68 parts and the amount of additional acetic acid added for the calcium hydroxide reaction is about 3.14 parts. In Example 5, the amount of acetic acid catalyst used during the zinc oxide reaction is about 1.68 parts and the amount of additional acetic acid added for the calcium hydroxide reaction is about 1.57 parts. In Example 6, the amount of acetic acid catalyst used during the zinc oxide reaction is about 1.99 parts and the amount of additional acetic acid added for the calcium hydroxide reaction is about 1.57 parts.

In Example 7, the amount of acetic acid catalyst employed is about 5.88 parts; in Example 8, about 6.72 parts; in Example 9, about 7.13 parts; in Example 10, about 7.45 parts; and in Example 11, about 7.55 parts.

It is to be understood that the above description and working examples are illustrative of this invention and not in limitation thereof.

What I claim and desire to protect by Letters Patent is:

1. As a new composition of matter, a metal salt of a partial rosin ester selected from the group consisting of (1) a zinc salt of a partial rosin ester in which the combined zinc is, by weight, from about 6% to about 10.8% of the weight of the zinc salt and (2) a zinc-calcium salt of a partial rosin ester in which the combined zinc is, by weight, from about 3.1% to about 6.1% and the combined calcium is, by weight, from about 0.9% to about 2.1% based on the weight of the zinc-calcium salt, the said partial rosin ester being derived by reaction of rosin and an alcohol selected from the group consisting of ethylene glycol, diethylene glycol, triethylene glycol, 1,2-propane diol, 1,3-propane diol and $C_1$-$C_4$ monohydric alcohols in amounts such that for each equivalent weight of rosin reactant there is employed from about 5% to about 60% equivalent weight of alcohol, said metal salt being essentially free of unreacted rosin acids.

2. The new composition of claim 1 wherein the partial rosin ester is derived from hydrogenated rosin.

3. The new composition of claim 1 wherein the partial rosin ester is derived from hydrogenated rosin and diethylene glycol.

4. The new composition of claim 1 wherein the partial rosin ester is derived from hydrogenated rosin and triethylene glycol.

* * * * *